United States Patent [19]

Sakai et al.

[11] Patent Number: 5,473,775
[45] Date of Patent: Dec. 5, 1995

[54] PERSONAL COMPUTER USING FLASH MEMORY AS BIOS-ROM

[75] Inventors: Makoto Sakai; Makoto Arai, both of Tokyo, Japan

[73] Assignee: Kabushiki Kaisha Toshiba, Kawasaki, Japan

[21] Appl. No.: 958,556

[22] Filed: Oct. 8, 1992

[30] Foreign Application Priority Data

Oct. 11, 1991 [JP] Japan .................................. 3-264083

[51] Int. Cl.[6] .................................................... G06F 9/24
[52] U.S. Cl. .................................. 395/700; 364/DIG. 1; 364/280; 364/280.2; 364/280.9
[58] Field of Search ................................. 395/700, 375, 395/400

[56] References Cited

U.S. PATENT DOCUMENTS 5,187,792  2/1993  Dayan et al. .......................... 395/725
5,257,380  10/1993  Lang ...................................... 395/700
5,261,104  11/1993  Bertram et al. ....................... 395/700

OTHER PUBLICATIONS

"Flash memory BLOS for PC and notebook computers", Jerry Jex, IEEE. Conf. on comm., Computers and Signal Processing, May 1991, pp. 692–695.
IEEE Pacific Rim Conf. On Communications, Computers And Signal Processing. vol. 2, 9 May 1991, Victoria, BC, Canada pp. 692–695, JEX: 'Flash memory BIOS for PC and notebook computers.'

Primary Examiner—Kevin A. Kriess
Attorney, Agent, or Firm—Limbach & Limbach

[57] ABSTRACT

A personal computer uses a flash memory equipped with a main block storing a boot block and a basic input/output system as its BIOS-ROM. An address translation circuit, after power-on reset, supplies addresses output by a central processing unit to the BIOS-ROM as they are to thereby allow access to the boot block storing a far jump instruction. After system startup, the address translation circuit inverts a predetermined bit of each address output by the CPU to thereby allowing access to the BIOS. To refresh the contents of the BIOS-ROM, the CPU transfers a BIOS stored on a floppy disk to the main block of the BIOS-ROM.

24 Claims, 11 Drawing Sheets

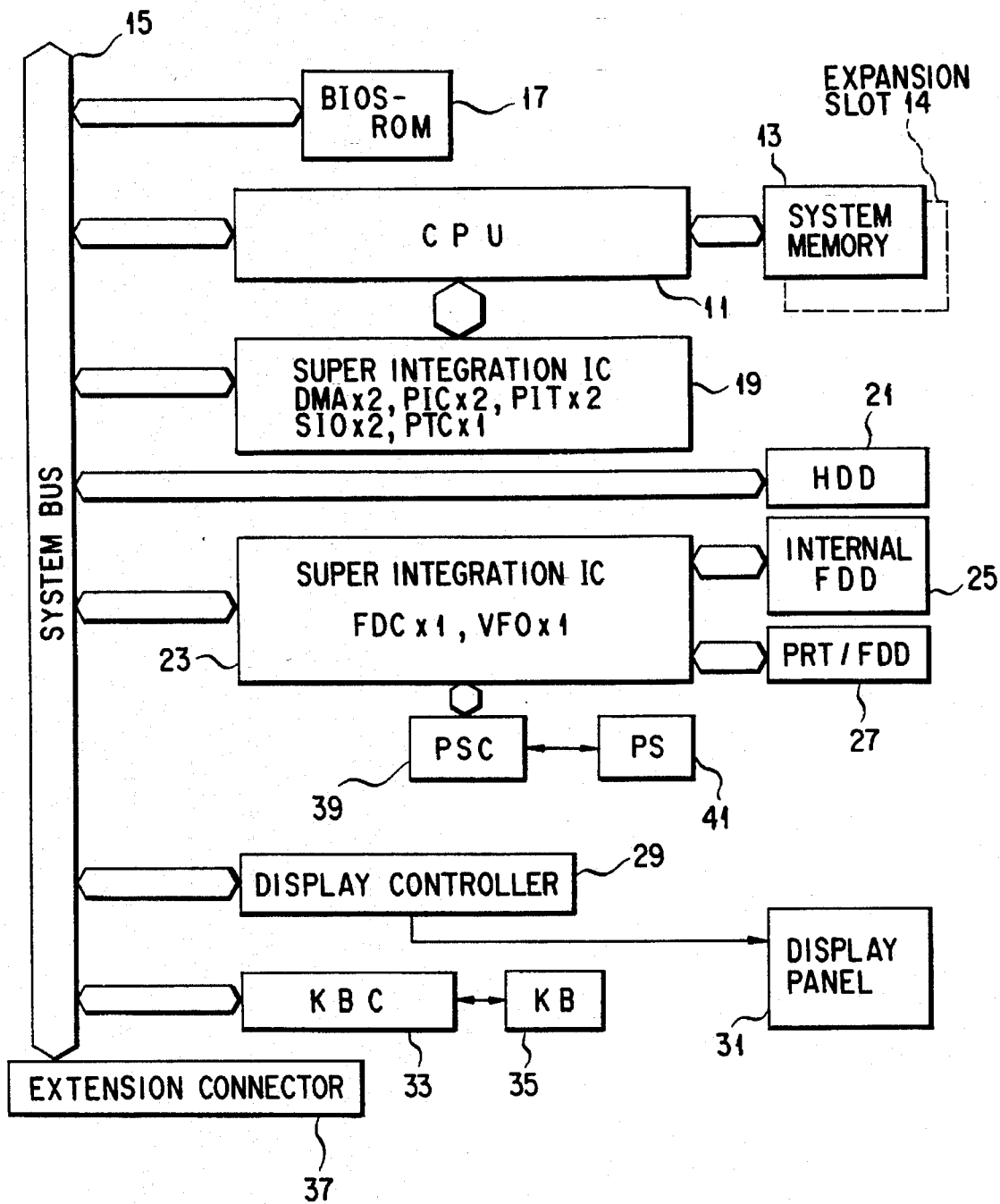
F I G. 1

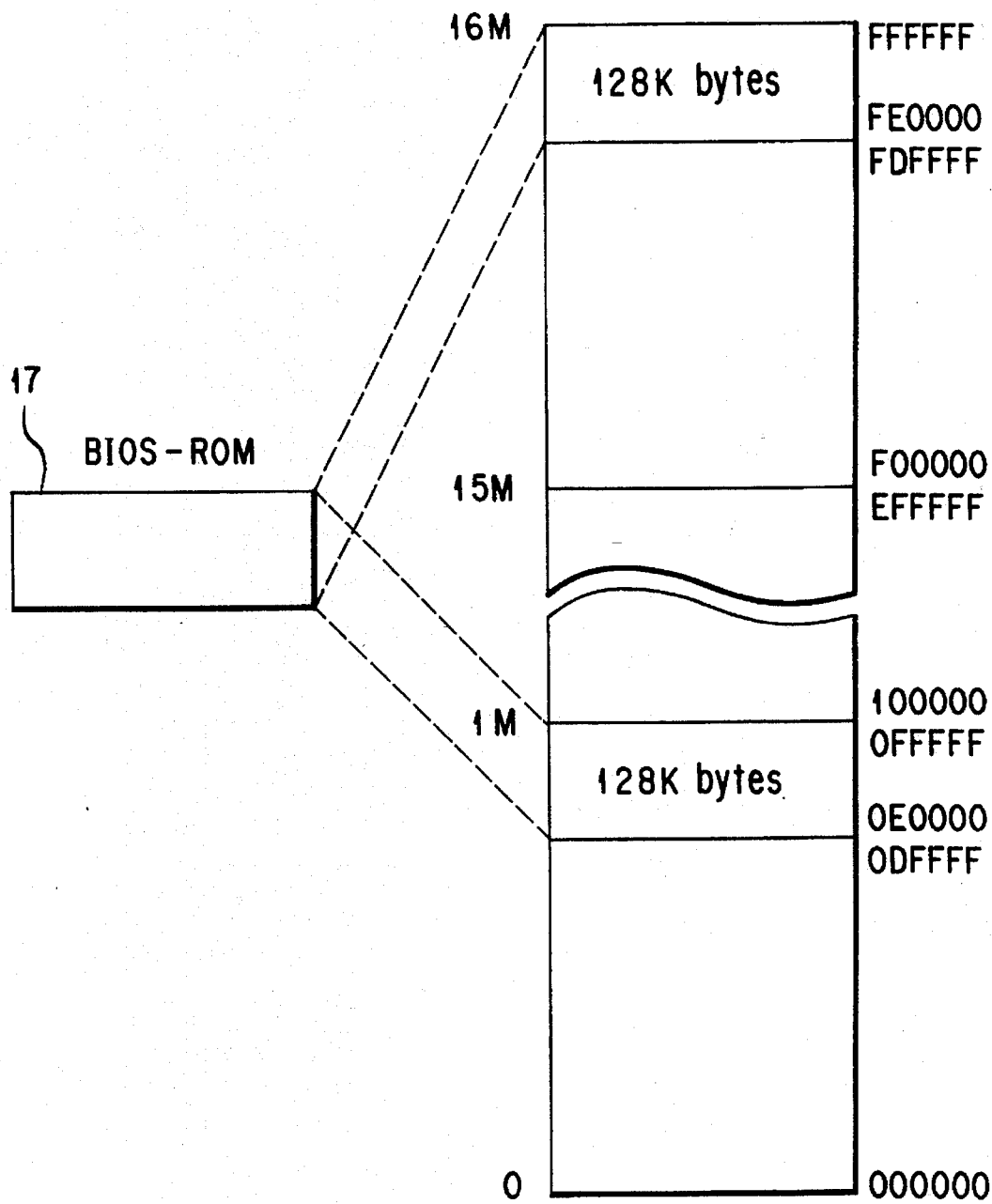
F I G. 3

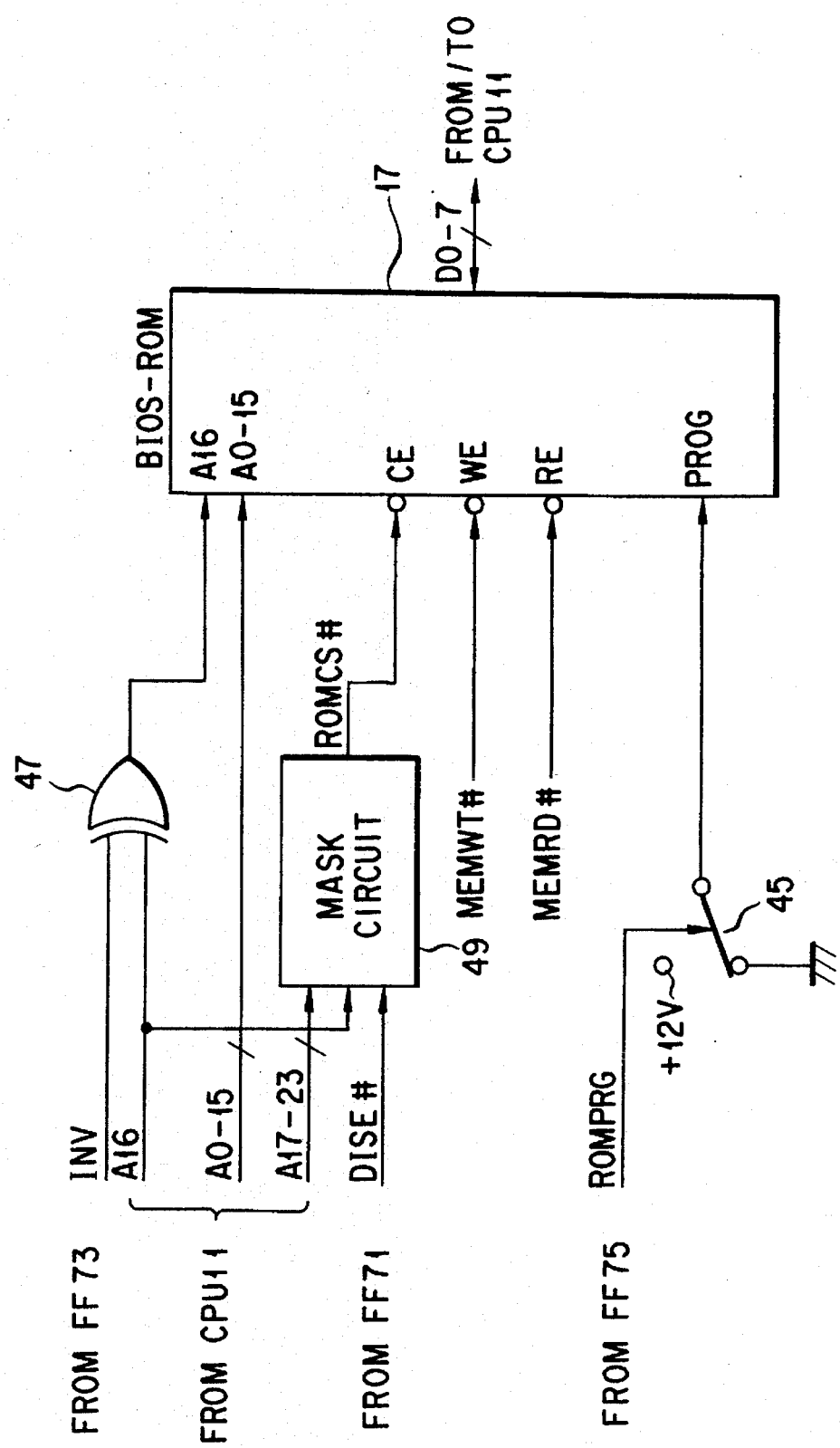
F I G. 5

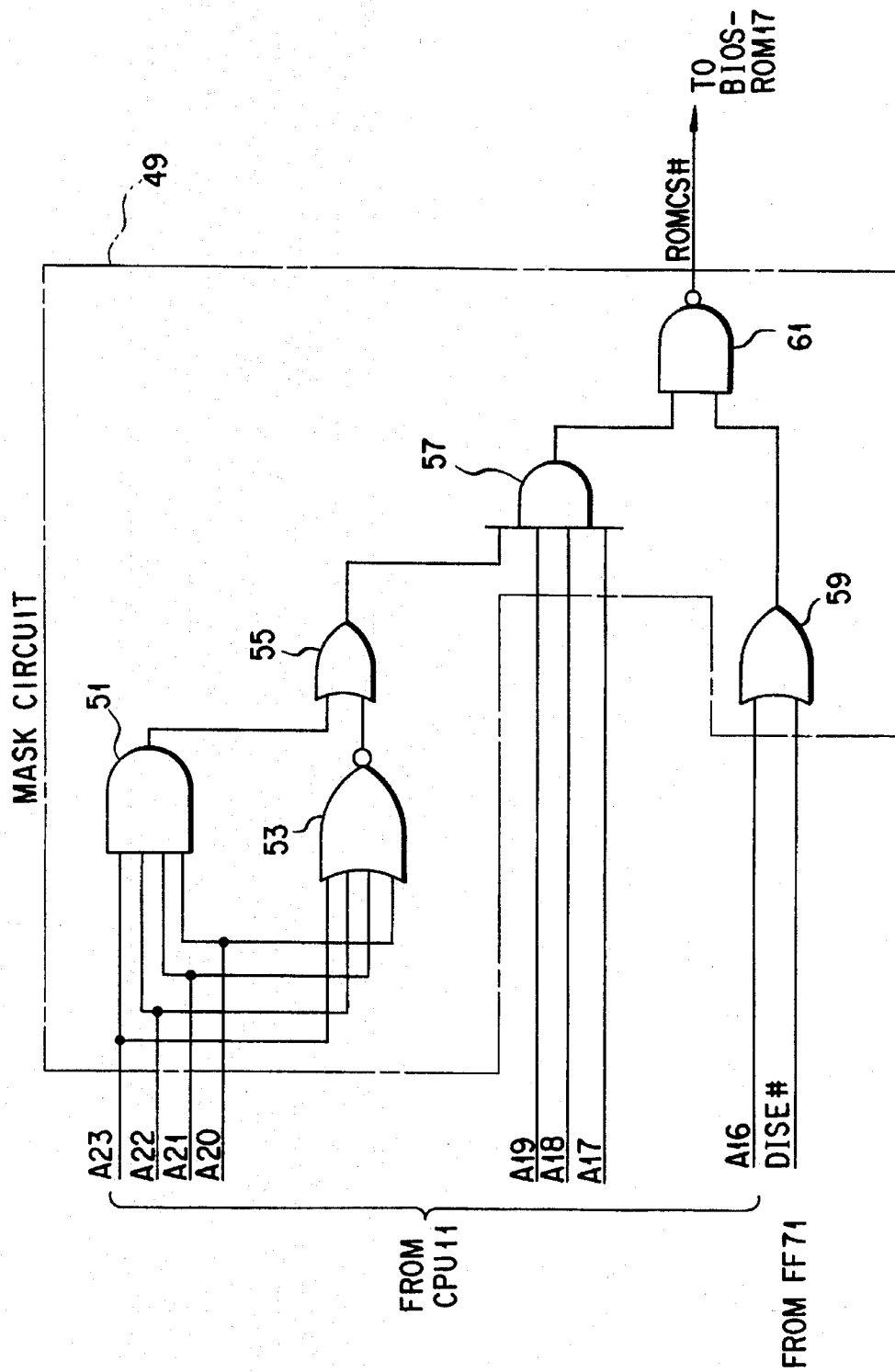
F I G. 6

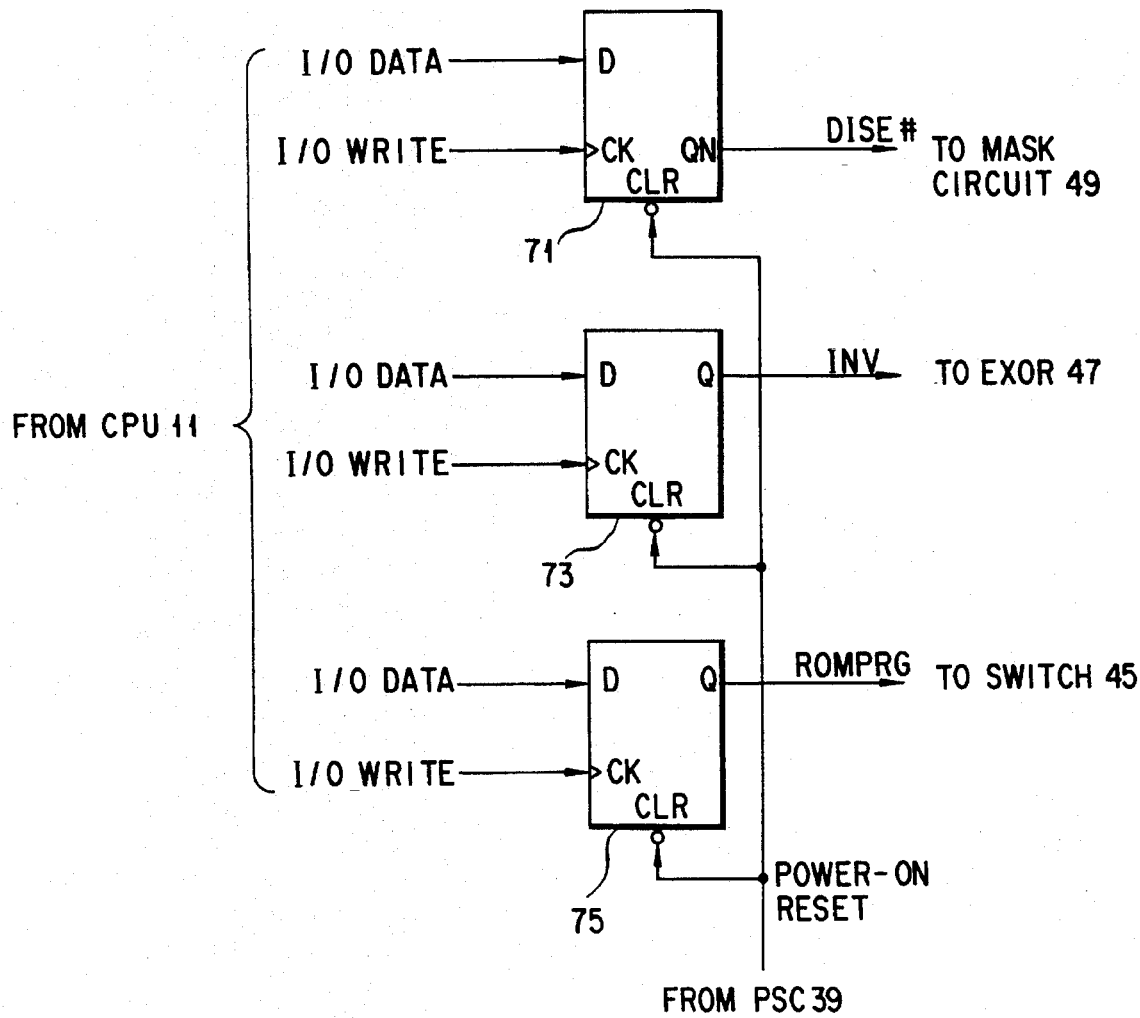
F I G. 7

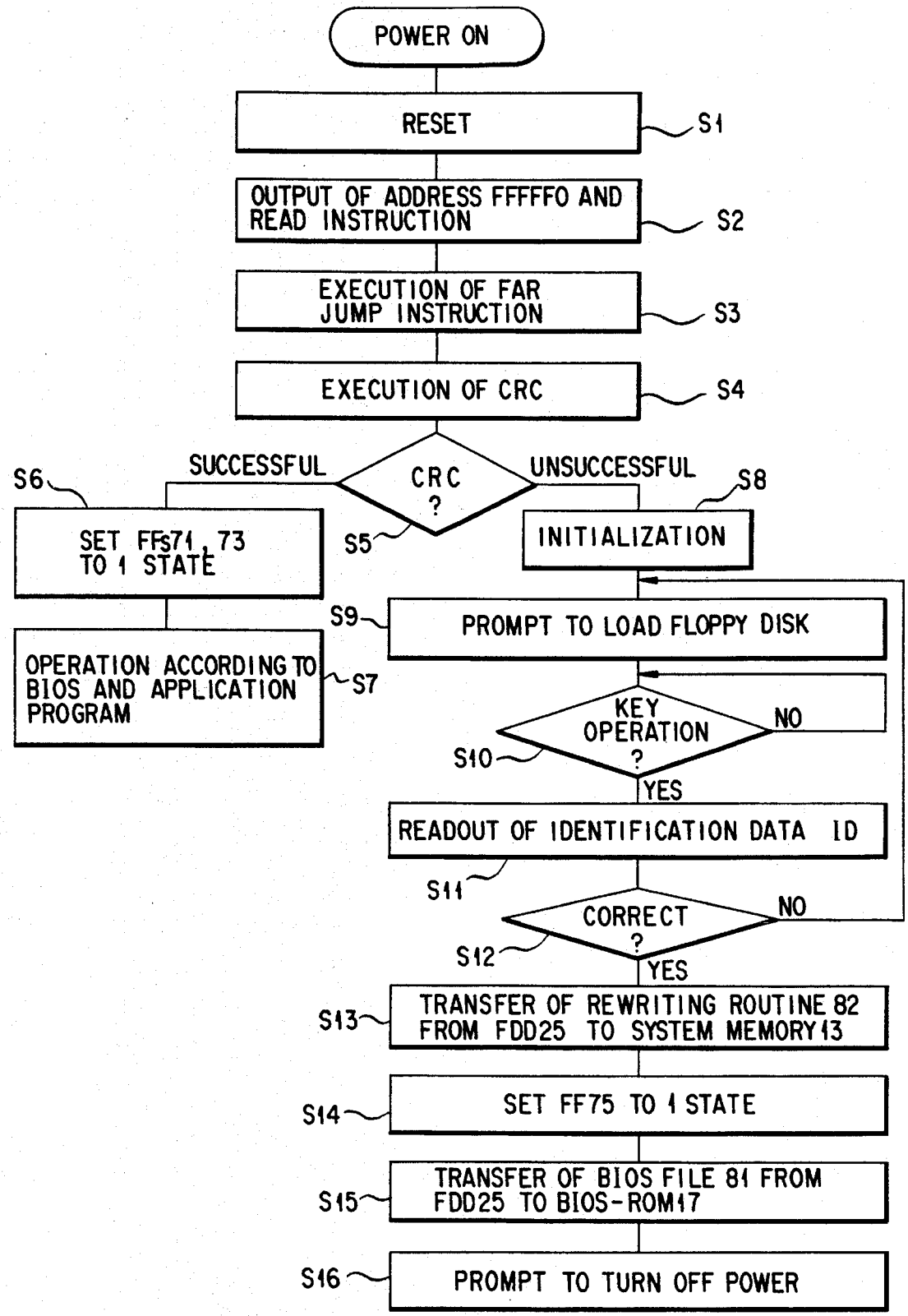
F I G. 9

PERSONAL COMPUTER USING FLASH MEMORY AS BIOS-ROM

BACKGROUND OF THE INVENTION

1. Field of the Invention

The invention relates to a personal computer using a flash memory as its BIOS-ROM.

The invention also relates to a personal computer suitable for externally rewriting the contents of its BIOS-ROM.

2. Description of the Related Art

In general, a computer system, such as a personal computer, is equipped with a ROM (read only memory) for storing a BIOS (basic input/output system). Heretofore, in the event of destruction of the contents of the BIOS-ROM or revision of the BIOS, the BIOS-ROM has had to be replaced by a new chip. In order to replace the ROM chip with a new one, it is required to open the computer casing. The work of opening the computer casing and replacing the ROM chip with a new one is very troublesome.

Flash memories have been put on the market recently as rewritable ROMs. They have various features. One of them is that stored data can be erased block by block. Thus, the use of a flash memory as the BIOS-ROM would be convenient.

The flash memory is generally equipped with a control read-only area, called a boot block, at the end of its storage area. In the case where this type of flash memory is used as the BIOS-ROM, therefore, it is required to make access to the boot block in order to execute a far jump instruction first immediately after the CPU has been reset. In the subsequent normal state, it is required to make access to another area storing the BIOS. It is preferable that the BIOS be compatible with existing personal computers.

The boot block in which a far jump instruction is placed overlaps an area for storing the BIOS compatible with existing personal computers on CPU-visible memory space (address space). In order to make access to the boot block to execute the far jump instruction immediately after the power-on reset and access to the BIOS storage area in the subsequent normal state, some consideration will be needed for controlling address data.

In addition, some consideration will be needed to allow areas within the BIOS-ROM that are not accessed in the normal state, i.e., memory space allocated to other areas, such as the boot block, than the area storing the BIOS, to be opened to other than the BIOS-ROM access.

SUMMARY OF THE INVENTION

It is therefore an object of the present invention to provide a personal computer which, when its BIOS-ROM is constructed from a flash memory, permits access to the boot block so as to execute the far jump instruction immediately after the power-on reset and access to the BIOS storage area in the subsequent normal state.

It is another object of the present invention to provide a personal computer which permits areas within the BIOS-ROM that are not accessed in the normal state, i.e., memory space allocated to other areas than the area storing the BIOS, such as the boot block, to be opened to other than the BIOS-ROM access.

It is still another object of the present invention to provide a personal computer, in which the contents of the BIOS-ROM can be rewritten to correct data in case they have defect, or be rewritten to a late version of the BIOS.

According to a first aspect of the present invention there is provided a personal computer comprising: a BIOS-ROM comprising a flash memory having a first storage area which reserves a boot area and a second storage area which stores a basis input/output system (BIOS); data processing means for, immediately after power-on reset, outputting predetermined address data to make access to said boot area of said BIOS-ROM and for, after system startup, performing operations according to said basic input/output system stored in said BIOS-ROM; and address translating means for, after system startup, translating addresses, of addresses output from said data processing means, which designate said first storage area to addresses that designate said second area of said BIOS-ROM.

According to the personal computer of the first aspect of the present invention, even if the boot area (boot block) and the BIOS are visible to the data processing unit (CPU) as if they were present on the same memory space, the address translation circuit allows access to the boot area storing the far jump instruction immediately after power-on reset and access to the BIOS in the normal state after system startup. Therefore, a flash memory having a boot area can be used as a computer BIOS memory (BIOS-ROM).

According to a second aspect of the present invention there is provided a personal computer comprising: a BIOS-ROM comprising a flash memory storing a first basic input/output system (BIOS); an external storage device storing a second basic input/output system; inputting means for inputting an instruction to transfer said second basic input/output system stored in said external storage device to said BIOS-ROM; and means responsive to said instruction from said inputting means for transferring said second basic input/output system stored in said external storage device to rewriting stored data of said BIOS-ROM.

The personal computer according to the second aspect of the present invention permits the stored contents of the BIOS-ROM to be refreshed from the external storage device storing the BIOS by means of the rewriting means. The BIOS in the BIOS-ROM can be readily rewritten in the event of its destruction or updated to accommodate its new version.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a personal computer according to a first embodiment of the present invention;

FIG. 3 is a diagram for use in explanation of memory space allocated to the BIOS-ROM of FIG. 1;

FIG. 4A is a diagram for use in explanation of a relationship between addresses and areas of the BIOS-ROM visible to the CPU of FIG. 1 immediately after the power has been turned on;

FIG. 4B is a diagram for use in explanation of a relationship between addresses and areas of the BIOS-ROM visible to the CPU of FIG. 1 in the normal state;

FIG. 5 illustrates an address circuit for addressing the BIOS-ROM;

FIG. 6 is a circuit diagram of the masking circuit of FIG. 5;

FIG. 7 is a block diagram of a circuit for producing various control signals used in the address circuit of FIG. 5;

FIG. 9 is a detailed flowchart of the flowchart of FIG. 8;

FIG. 12 is a flowchart illustrating the operation of the personal computer according to the second embodiment equipped with the circuit of FIG. 11 when the power is turned on.

DETAILED DESCRIPTION OF THE PREFERRED EMBODIMENTS

Figure 2:
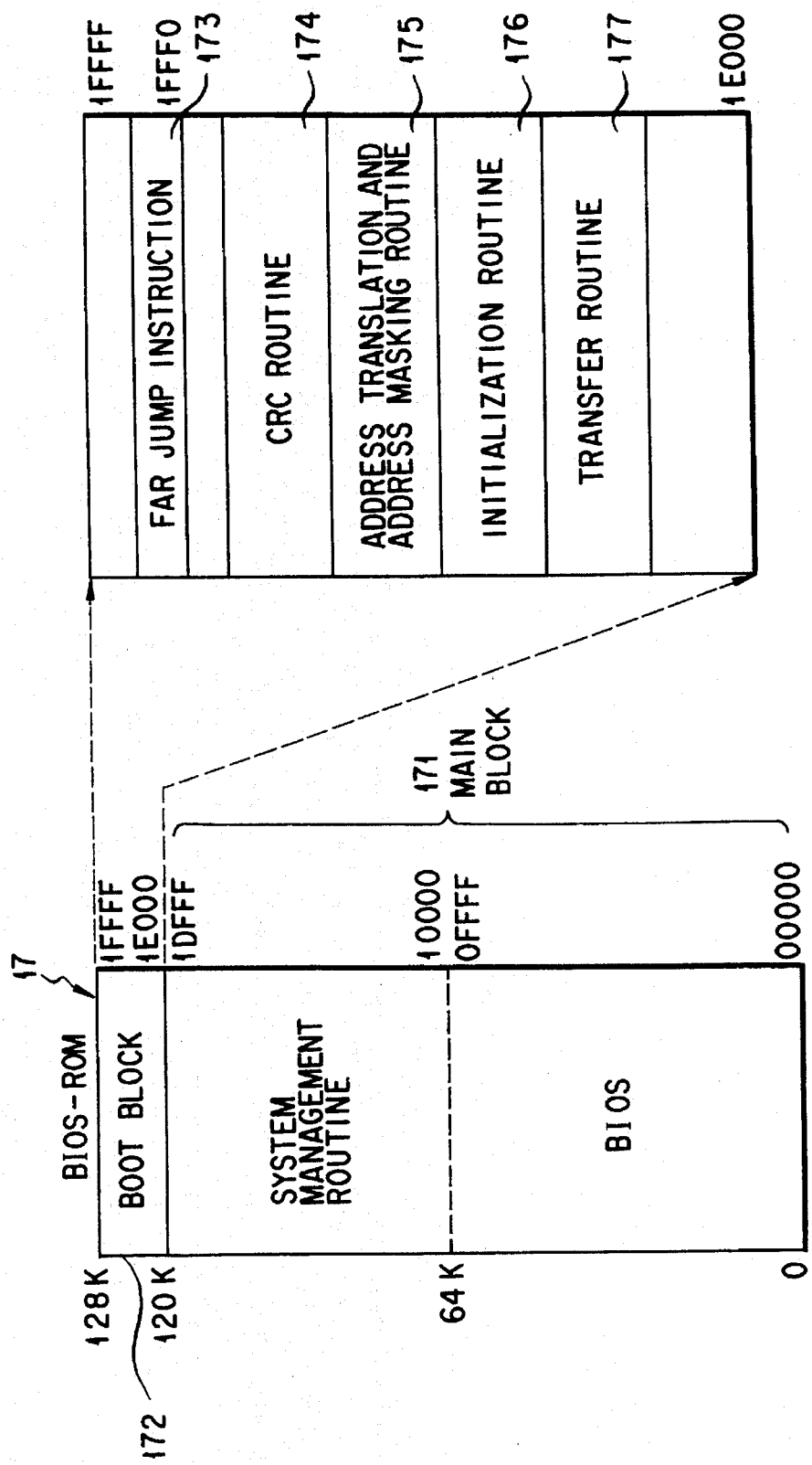
FIG. 2 illustrates a memory map of the BIOS-ROM shown in FIG. 1.

Referring now to FIG. 1, a personal computer according to a first embodiment of the present invention, which is a portable computer, is equipped with a CPU (central processing unit) 11 for controlling the whole system. The CPU 11 has a capability of processing 16-bit data and 24-bit addresses. As the CPU 11, a microprocessor, such as the Intel 386SL, may be used.

A system memory 13 is connected to the local bus of the CPU 11. The memory 13 is used as the main memory of the present system (i.e., the personal computer system). The memory 13 stores programs and data that are to be processed. In the present embodiment, the system memory 13 has a standard storage capacity of 2M bytes that is expandable up to 18M bytes by plugging an expansion memory into an expansion slot 14.

The CPU 11 is connected to a system bus 15 that is used for transferring address data, data, and control data.

To the system bus 15 is connected a BIOS-ROM 17 storing the BIOS (basic input/output system) and so on. The BIOS-ROM 17 consists of a flash memory. The BIOS-ROM will be detailed later with reference to FIGS. 2, 3, 4A and 4B.

To the system bus 15 is also connected a super integration IC 19, which includes two DMA controllers for direct memory access control, two programmable interrupt controllers (PICs), two programmable interval timers (PITs), two serial input/output controllers (SIOs), and a real-time clock (RTC). For example, an Intel 82360SL chip can be used as the IC 19.

To the system bus 15 are also connected a hard disk drive (HDD) 21 and a super integration IC 23.

The hard disk drive 21 has an integrated drive electronics (IDE) interface and permits direct access by the CPU 11. The hard disk drive uses a 2.5-in. disk having a storage capacity of 120/200M bytes.

The super integration IC 23 includes a floppy disk controller (FDC) for controlling a floppy disk drive and a variable-frequency oscillator (VFO) for producing clocks for the FDC. For example, a Toshiba T9920 chip can be used as the IC 23.

To the IC 23 is connected a floppy disk drive (internal FDD) 25 that is standard on the personal computer. To the IC 23 is connected an external floppy disk drive or a printer (PRT/FDD) 27 as required. To the IC 23 is further connected a power supply controller (PSC) 39 for controlling a system power supply (PS) 41. The power supply controller 39 produces a power-on reset signal at a time when the system power is turned on.

To the system bus 15 is further connected a display controller 29, which controls a display panel 31 such as a liquid crystal display panel.

To the system bus 15 is further connected a keyboard controller (KBC) 33, which controls a keyboard (KB) 35 connected thereto. That is, the keyboard controller 33 scans the key matrix of the keyboard 35 to receive a signal corresponding to a pressed key and translates it to a predetermined key code. This key code is transmitted to the CPU 11 over the system bus 15 on a handshaking, serial communication basis.

To the system bus 15 is further connected an extension connector 37, to which an extension unit (extension board) is connectable to increase the functions of the computer.

Next, the configuration of the BIOS-ROM 17 and the memory space (address space) allocated to the BIOS-ROM will be described with reference to FIGS. 2, 3, 4A and 4B.

First, the BIOS-ROM 17 consists of a flash memory having a storage capacity of 8 bits×128K, i.e., 128K bytes. As shown in FIG. 2, the 0- to 120K-byte area of the BIOS-ROM 17, i.e., the area having physical addresses 00000H through 1DFFFH, is a main block 171 that is readable, writable and erasable. The last "H" indicates that the addresses are represented in hexadecimal. In the subsequent representation of the address, however, the "H" will be omitted. The 120K- to 128K-byte area of the BIOS-ROM 17, i.e., the area having physical addresses 1E000 through 1FFFF, is a read-only boot block 172. As the BIOS-ROM 17 there is available an Intel i28F001BX-T chip, for example.

The boot block 172 of the BIOS-ROM 17 is an area that stores programs for executing minimum functions for system control. In the boot block 172 there are stored a far jump instruction 173, a cyclic redundancy check routine (CRC) 174, and an address translation and address masking routine 175 for translating and masking addresses of the BIOS-ROM 17. The boot block 172 also stores an initialization routine 176 for minimum initialization processing and a transfer routine 177 used to transfer a rewriting routine adapted for rewriting the BIOS-ROM 17 from the floppy disk drive 25 to the system memory 13. The far jump instruction 173 is stored in an area of the BIOS-ROM 17 starting with address 1FFF0.

In the 0- to 64K-byte area (low memory area) of the main block 171 on the BIOS-ROM 17 is stored the BIOS including an initialization routine (IRT), e.g., the BIOS having compatibility with existing personal computers. In the 64- to 120K-byte area of the main block 171, i.e., in its remaining 56K-byte area (high memory area) there is stored a system management routine, which is a program for setup, power saving, suspend, resume, etc.

The 128K-byte area of the BIOS-ROM 17 will be visible to the CPU 11 as if it were present in the last 128K-byte area (at the high address end) of the 15M- to 16M-byte area on 16M-byte memory space, i.e., the area starting at address FE0000 and ending at address FFFFFF as shown in FIG. 3. The 128K-byte area of the BIOS-ROM 17 will also be visible to the CPU 11 as if it were present in the last 128K-byte area (at the high address end) of the 0- to 1M-byte area on 16M-byte memory space, i.e., the area starting at address 0E0000 and ending at address 0FFFFF as shown in FIG. 3.

Figure 4:
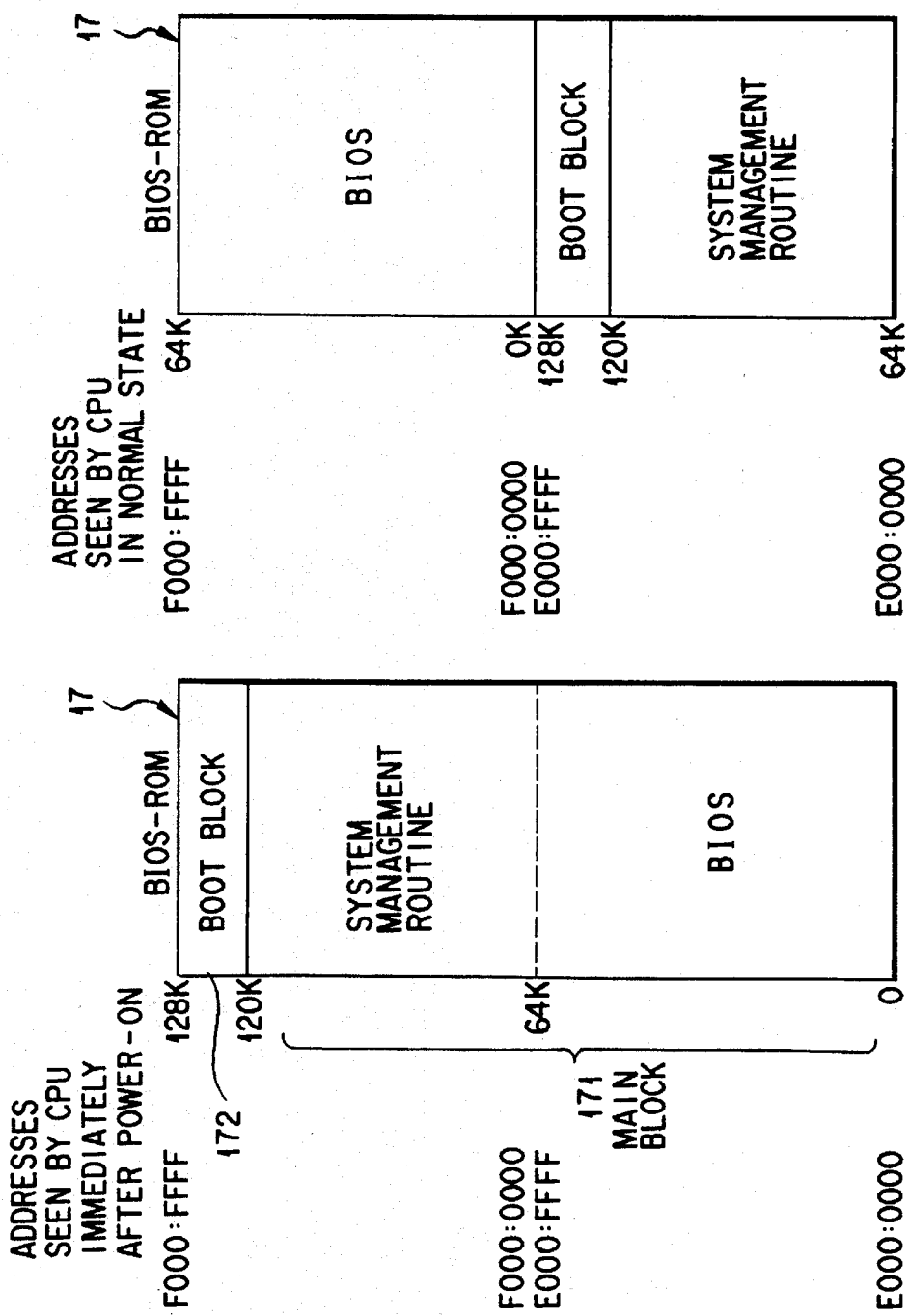

When seen from the CPU 11 immediately after the power has been turned on, the address assignment of the BIOS-ROM 17 is made such that, as shown in FIG. 4A, the low 64K-byte area (the first half of the 128K-byte area; 0 to 64K bytes) is assigned E000 (segment address):0000 (intrasegment address) through E000:FFFF and the high 64k-byte area (the second half of the 128K-byte area; 64K bytes to 128K bytes) is assigned F000:0000 through F000:FFFF. In the normal state, on the other hand, the low 64K-byte area of the BIOS-ROM 17 is assigned F000:0000 through F000:FFFF and the high 64k-byte area is assigned E000:0000 through E000:FFFF as shown in FIG. 4B. As can be seen from comparison between FIGS. 4A and 4B, the address assignment to the low 64K-byte area and the high 64K-byte area seen from the CPU 11 is reversed immediately after the power-on and in the normal state. (In other words, in the normal state, the low 64K-byte area is assigned the same addresses as those assigned to the high 64K-byte area immediately after the power-on, while the high 64K-byte area is assigned the same addresses as those assigned to the low 64K-byte area immediately after the power-on.) The detail of such address translation will be described later with reference to FIG. 5. Note that address PQRS:TUVW can be translated to address that the CPU 11 will produce in accordance with an add operation of PQRS0+TUVW.

Next, a circuit for addressing the BIOS-ROM 17 will be described with reference to FIG. 5. The BIOS-ROM 17 is supplied with a 17-bit address with bits A0 through A16 corresponding to its storage capacity of 128K bytes, a chip select signal ROMCS# (# indicates low active), a memory write signal MEMWT#, a memory read signal MEMRD#, and a write signal PROG.

Bits A0 through A15 of a 24-bit address (A0–A23) output from the CPU 11 are directly applied to the BIOS-ROM 17. The address bit A16 is applied to the BIOS-ROM 17 via an exclusive OR gate 47 where it is EXCLUSIVE ORed with a control signal INV, which permits such address translation as shown in FIGS. 4A and 4B to be implemented.

The write signal PROG is raised to +12 volts at the time of writing of data and maintained at ground (0 volts) in other states. A change of the voltage level of the write signal PROG is made by a switching operation of a switch 45 that responds to a control signal ROMPRG. As the switch 45, an active switching device, such as a relay, an FET, etc., can be used.

The chip select signal ROMCS# is produced by a masking circuit 49 that receives the high-order eight bits A16 through A23 of the 24-bit address (A0–A23) output from the CPU 11 and a control signal DISE#. The masking circuit will be described below with reference to FIG. 6.

The masking circuit 49 is constructed from AND gates 51 and 57, a NOR gate 53, OR gates 55 and 59, and a NAND gate 61. Of the address bits A0 through A23 output from the CPU 11, the high-order four bits A20 through A23 are applied to the AND gate 51 to detect whether or not A20 through A23 are all 1s (F in hexadecimal representation). The four bits A20 through A23 are also applied to the NOR gate 53 to detect whether or not they are all 0s (0 in hexadecimal representation). The outputs of the AND gate 51 and the NOR gate 53 are coupled to the OR gate 55.

The output of the OR gate 55 and the address bits A17–A19 are applied to the AND gate 57 to detect whether or not the address bits A20–A23 are all 1s or 0s and the address bits A17–A19 are all 1s. That is, it is detected if the address (A0–A23) is FFxxxx, FExxxx, 0Fxxxx, or 0Exxxx (xxxx indicates any value in the range of 0000 to FFFF). The address bit A16 and the control signal DISE# are applied to the OR gate 59.

The outputs of the AND gate 57 and the OR gate 59 are applied to the NAND gate 61. The NAND gate 61 outputs a chip select signal ROMCS# at a low level that is active when both of the outputs of AND gate 57 and OR gate 59 are high. On the other hand, when at least one of the outputs of AND gate 57 and OR gate 59 is low, a chip select signal ROMCS# at a high level that is not active will be output from the NAND gate 61.

With the arrangement of the masking circuit 49 described above, in the state shown in FIG. 4B, when an address that designates a location in the 64K- to 128K-byte area of the BIOS-ROM 17 is output from the CPU 11, the A16 is a 0 (at a low level). If the signal DISE# is at a low level, therefore, the chip select signal ROMCS# is at a high level, disabling the BIOS-ROM 17. Thereby, access to the BIOS-ROM is prohibited. In other words, addresses in the range of E000:0000 to E000:FFFF are masked. The operation of the masking circuit 49 will be described later in more detail.

Next, reference will be made to FIG. 7 to describe a circuit for producing the control signal INV (refer to FIG. 5), the control signal DISE# (FIGS. 5 and 6), and the control signal ROMPRG (FIG. 5).

As shown in FIG. 7, a low-active power-on reset signal from the power controller (PSC) 39 shown in FIG. 1 is applied in common to the low-active clear terminals (CLR) of three D flip-flops (D-FF) 71, 73 and 75. The D flip-flops 71, 73 and 75 have their respective data inputs (D) connected to receive three 1-bit I/O data pieces from the CPU 11, and their respective clock inputs (CK) connected to receive three I/O write signals from the CPU 11. The negative-phase output (QN) of the D flip-flop 71 serves as the signal DISE#, the positive-phase output (Q) of the D flip-flop 73 serves as the signal INV, and the positive-phase output (Q) of the flip-flop 75 acts as the signal ROMPRG.

Hereinafter, the operation of the system configured as described above will be described briefly with reference to a flowchart shown in FIG. 8.

Figure 8:
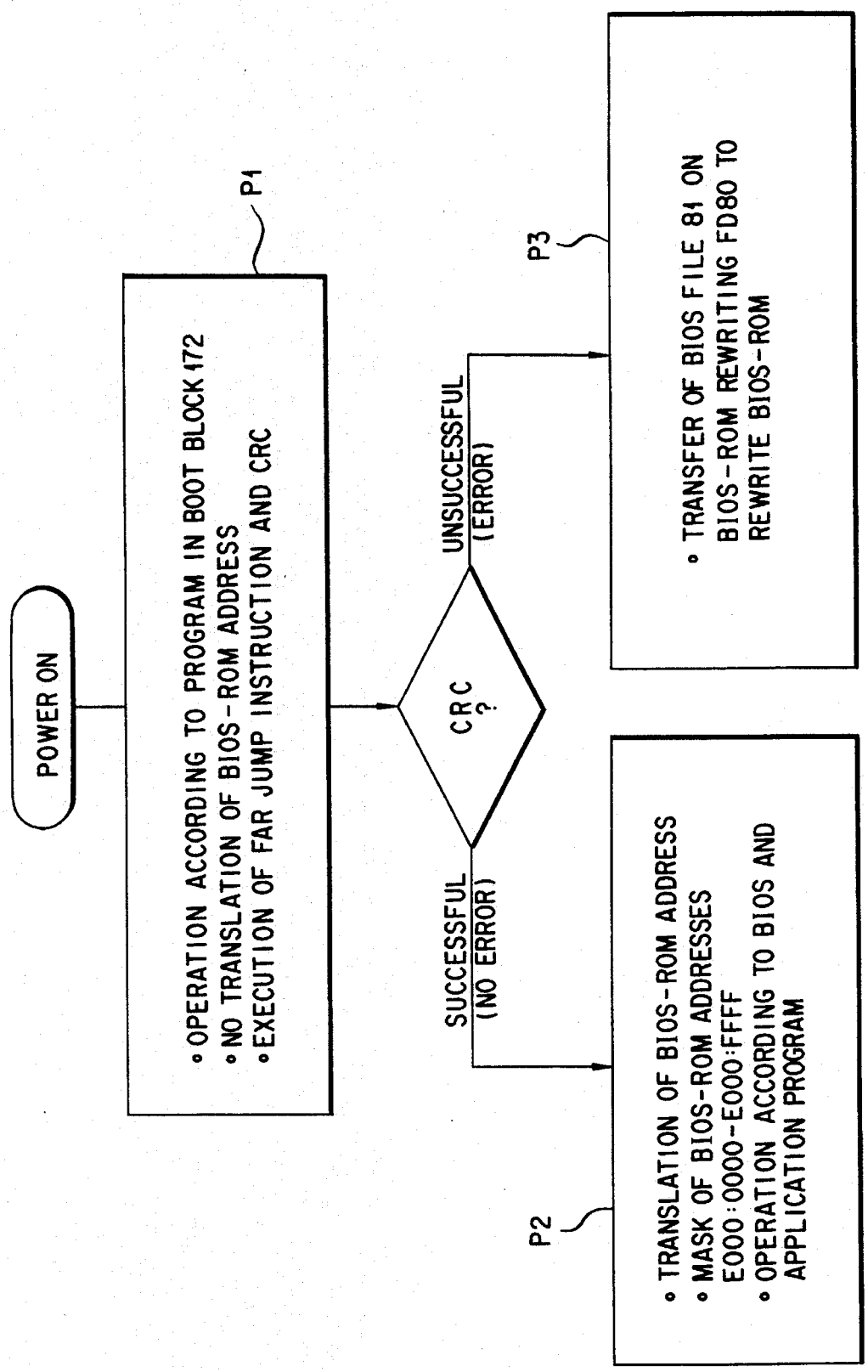
FIG. 8 is a flowchart illustrating the operation of the computer system shown in FIGS. 1 through 7.

After the power is turned on, the system operates according to programs stored in the boot block 172 of the BIOS-ROM 17 as shown in FIG. 8 (step P1). Here, the present system makes access to the boot block 172 without performing the address translation by the exclusive OR gate 47, thereby to execute the far jump instruction 173 and the cyclic redundancy check (CRC) routine 174 for the contents of the BIOS-ROM 17, etc.

When the cyclic redundancy check results in success (no error), the present system performs processing in step P2 shown in FIG. 8. In step P2, the present system translates the addresses of the BIOS-ROM 17 so that the state shown in FIG. 4B results. In addition, the system masks addresses of the 64K- to 128K-byte area of the BIOS-ROM 17, i.e., addresses in the range of E0000:0000 to E000:FFFF. Subsequently, the system operates according to the BIOS stored in the 0- to 64K-byte area of the BIOS-ROM and application programs stored in the system memory 13.

In the event of failure of the cyclic redundancy check (the detection of errors), on the other hand, the system transfers a BIOS file 81 stored in the BIOS-rewriting floppy disk (FD) 80 from the floppy disk drive (internal FDD) 25 to the BIOS-ROM 17, thereby repairing (refreshing) the BIOS-ROM 17 (step P3). The floppy disk 80 will be described later with reference to FIG. 10.

Next, the operation illustrated in FIG. 8 will be described in more detail with reference to a flowchart of FIG. 9.

When the power switch of the system is turned on, the power controller (PSC) 39 outputs a power-on reset signal at a low level, which is, in turn, applied in common to the clear terminals (CLR) of the D flip-flops 71, 73 and 75 shown in FIG. 7. Thereby, the D flip-flops 71, 73 and 75 are all reset, so that the signal DISE# goes high, and the signals INV and ROMPRG go low.

The power-on reset signal from the power controller 39 is also applied to the CPU 11, so that it is reset (step S1). As a result, the CPU 11 outputs an initial address, for example, FFFFF0 and a memory read instruction so as to execute the far jump instruction (step S2). When the instruction is decoded by the CPU 11, the memory read signal MEMRD# goes to the active level (low level).

Of the address (FFFFF0) output from the CPU 11, the bit A16 is applied to the exclusive OR gate 47 together with the signal INV from the D flip-flop 73. At this point, the signal INV is low, so that the address bit A16 is applied unchanged to the BIOS-ROM 17 via the exclusive OR gate 47. The address bits A0 through A15 of the address (FFFFF0) output from the CPU 11 are also applied to the BIOS-ROM 17 as they are.

In this case, the addresses of the BIOS-ROM are visible to the CPU 11 as shown in FIG. 4A. Thus, the boot block 172 of the BIOS-ROM 17 is addressed by the address bits A0 through A16 (1FFFF0) of the address FFFFF0 output from the CPU 11. Then, the far jump instruction 173 and a vector address indicating the destination of a jump within the boot block 172 are read from an area of the boot block 172 starting at address 1FFF0. The CPU 11 executes the far jump instruction 173 according to the vector address (step S3). After the execution of the far jump instruction 173, the 128K-byte area of the BIOS-ROM 17 will be seen by the CPU 11 to be present in the last 128K-byte area (high address end) of the 0- to 1M-byte area in the 16M-byte memory space as shown in FIG. 3.

The CRC routine 174 for making the cyclic redundancy check for the stored contents of the BIOS-ROM 17 is stored in that area to which a jump is made which is specified by the vector address. Consequently, subsequent to the execution of the far jump instruction 173, the cyclic redundancy check for the stored contents of the BIOS-ROM 17 is made in accordance with the CRC routine 174 (step S4).

As a result of the execution of the CRC routine 174, when the cyclic redundancy check for the BIOS-ROM 17 results in success (step S5), the CPU 11 loads I/O data at a high level into each of the D flip-flops 71 and 73 according to the routine 175 for address translation and address masking (step S6). This causes the signal DISE# to go low and the signal INV to go high. The CPU 11 then operates according to the BIOS stored in the 0- to 64K-byte area of the BIOS-ROM 17 and application programs stored in the system memory 13.

In making access to the BIOS, the CPU 11 will output addresses in the range of F000:0000 to F000:FFFF (i.e., F0000 to FFFFF) as in the case of BIOS access in existing personal computers. If, in this case, the BIOS-ROM 17 were accessed by the addresses for BIOS access without performing address translation by the exclusive OR gate 47, the boot block 172 or the system management routine within the BIOS-ROM 17 would be improperly accessed as will be readily understood from FIG. 4A. According to the present embodiment, however, the address translation by the exclusive OR gate 47 allows proper access to the BIOS within the BIOS-ROM 17.

When the signal INV is raised to a high level by step S6, the bit A16 of address Fxxxx (xxxx indicates any value in the range of 0000 to FFFF) output from the CPU 11 to make access to the BIOS is level converted by the exclusive OR gate 47 from a 1 to a 0. The resulting bit A16 at logic 0 is applied to the BIOS-ROM 17. Meanwhile, the bits A0 through A15 of the address Fxxxx are applied to the BIOS-ROM 17 as they are.

In this way the address Fxxxx output from the CPU 11 to make access to the BIOS is converted to Exxxx for application to the BIOS-ROM 17. As a result, the BIOS stored in the 0- to 64K-byte area of the BIOS-ROM 17 will be accessed. The CPU 11 then enters the normal state in which it operates according to the BIOS and the application programs stored in the system memory 13 as described above.

Suppose that, in this state, the CPU 11 outputs address Exxxx. The address bit A16, which is the least significant bit in the highest-order digit (hexadecimal number E) of the address Exxxx, is at a low level ("0"). The signal DISE# is also at a low level. Thus, the output of the OR gate 59 ORing the address bit A16 and the signal DISE# will be at a low level. In this case, the output of the NAND gate 61, i.e., the chip select signal ROMCS# is at a high level, disabling the BIOS-ROM 17 against access.

According to the present embodiment, as described above, in the normal state in which the CPU 11 operates according to the BIOS and application programs, the addresses E000:0000 through E000:FFFF are masked. In the normal state, therefore, the 64K-byte memory space within that address range can be opened to other than the BIOS-ROM 17, permitting efficient use of memory space. Even if that memory space is allocated to a memory area other than the BIOS-ROM 17 or an I/O area and access to that area is made, there is no possibility of accidental access to the BIOS-ROM 17 (its 64K- to 128K-byte area) and rewriting of the system management routine stored in the BIOS-ROM 17.

When it is decided in step S5 that the cyclic redundancy check is unsuccessful, on the other hand, the CPU 11 performs an initialization process required to rewrite the contents of the main block 171 of the BIOS-ROM 17 into correct data according to the initialization routine 176 stored in the boot block 172 of the BIOS-ROM 17 (step S8). That is, in step S8, the CPU 11 performs initialization of the display controller 29, the system memory 13, the floppy disk controller (FDC) within the super integration IC 23, the keyboard controller (KBC) 33, etc.

Subsequently, the CPU 11 performs successive steps S9 through S13 according to the transfer routine 177 stored in the boot block 172 of the BIOS-ROM 17.

Figure 10:
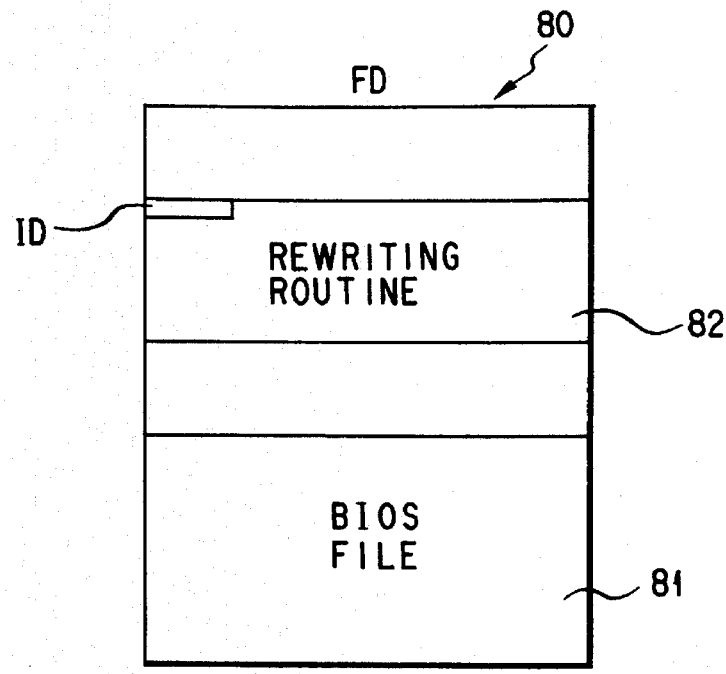
FIG. 10 is a data map of a floppy disk storing a BIOS file to be transferred to the BIOS-ROM.

First, the CPU 11 controls the display controller 29 to display on the display panel 31 an operation guidance that prompts the user to load a floppy disk (FD) 80 with such data structure as shown in FIG. 10 into the floppy disk drive (internal FDD) 25 (step S9). The operator guidance includes a prompt for the user to press any key on the keyboard (KB) 35 after the floppy disk has been loaded.

The user loads the floppy disk 80 into the FDD 25 and then presses a key on the keyboard 3 according to the prompts on the display screen. The keystroke is detected by the CPU 11 (step S10).

At this point, description is made of the floppy disk 80 shown in FIG. 10. The disk 80 is a floppy disk adapted to rewrite the BIOS-ROM. The disk 80 stores a BIOS file 81 and a rewriting routine 82 for rewriting (refreshing) the stored contents of the BIOS-ROM 17 by the BIOS file 81. In the BIOS file 81 are stored the BIOS and the system management routine. In a predetermined location of the rewriting routine 82 is stored identification data ID indicating that the floppy disk 80 is adapted for rewriting the BIOS-ROM.

Upon detecting a keystroke in step S10, the CPU 11 reads identification data ID from the predetermined location of the floppy disk loaded into the disk drive 25 and then determines whether or not that identification data ID is data unique to the BIOS-ROM rewriting floppy disk (steps S11, S12).

When it is decided in step S12 that the identification data ID is improper, the CPU 11 considers the floppy disk loaded into the disk drive 25 not to be the BIOS-ROM rewriting floppy disk 80 and then returns the processing to step S9.

On the other hand, when it is decided in step S12 that the identification data ID is proper, the CPU 11 considers that the BIOS-ROM rewriting disk 80 (in FIG. 10) has been properly loaded into the disk drive 25 and then transfers the rewriting routine 82 stored in the disk 80 to the system memory 13 (step S13).

Subsequently, the CPU 11 performs subsequent steps S14, S15 and S16 according to the rewriting routine 82 transferred to the system memory 13.

First, the CPU 11 loads I/O data at a high level into the D flip-flop 75 shown in FIG. 7 (step S14). This causes the signal ROMPRG to go high, so that the switch 45 is set to the +12V position. Thus, the +12V is applied to the terminal PROG of the BIOS-ROM 17 consisting of a flash memory, so that the BIOS-ROM 17 is write enabled.

At this point, the D flip-flops 71 and 73 are placed in the same state (cleared state) as when they are power-on reset, so that the signal DISE# is at a high level, while the signal INV is at a low level. When the signal INV is low, the address bit 16 from the CPU 11 is applied to the BIOS-ROM 17 as it is. If, in this case where the signal DISE# is high, the output of the AND gate 57 in the masking circuit 49 goes high, then the signal ROMCS# goes low regardless of the value of A16, allowing access to the BIOS-ROM 17.

There are two conditions under which the output of the AND gate 57 goes low. The first condition is that address bits A17 through A23 are all 1s, that is, the address A0–23 is FFxxxx (when A16=1) or FExxxx (when A16=0). The address range that satisfies the first condition is from FE0000 to FFFFFF indicating the high 128K-byte area in the 15M- to 16M-byte area on the 16M-byte memory space shown in FIG. 3. The second condition is that the address bits A17 to A19 are all 1s, and the address bits A20 to A23 are all 0s, that is, the address A0–23 is 0Fxxxx (when A16=1) or 0Exxxx (when A16=0). The address range that satisfies the second condition is from 0E0000 to 0FFFFF indicating the high 128K-byte area in the 0- to 1M-byte area on the 16M-byte memory space shown in FIG. 3.

In the present embodiment, therefore, if the address bits A17 through A23 output from the CPU 11 satisfy either of the two conditions when the +12V is applied to the terminal PROG of the BIOS-ROM 17 by step S14, then the signal ROMCS# goes low regardless of the value of A16. This allows access to the BIOS-ROM 17. That is, the entire main block 171 of the BIOS-ROM 17 is write enabled.

After the execution of step S14 that causes the BIOS-ROM 17 to be write enabled, the CPU 11 transfers the contents of the BIOS file 81 on the floppy disk 80 loaded into the disk drive 25 to the BIOS-ROM 17 and then writes the contents of the BIOS file 81 into the main block 171 of the BIOS-ROM 17 using addresses satisfying either of the above conditions (step S15). In this way the contents of the main block 171 of the BIOS-ROM 17 in which CRC errors have been detected can be rewritten (refreshed) by the contents of the BIOS file 81 stored in the BIOS-ROM rewriting floppy disk 80.

On completion of the rewriting of the contents of the BIOS-ROM 17, the CPU 11 controls the display controller 29 to thereby display a prompt "Turn off the system power temporarily and then turn on it again" on the display panel 31 (step S16). After the power has been turned on again, the system performs a series of operations as described above.

In the present embodiment, as described above, a flash memory is used as the BIOS-ROM 17, and access to the boot block 172 present in its end area (120K- to 128K-byte area) is allowed immediately after the power-on reset. Even if, in the normal state, the area (0- to 64k-byte area) that stores the existing-personal-computer-compatible BIOS is visible to the CPU 11 as if it were present in the end area (64K- to 128K-byte area) of the BIOS-ROM 17, access to the BIOS is allowed by translating addresses output from the CPU 11, more specifically, by inverting the address bit A16.

In the present embodiment, in order to prohibit access by the CPU 11 to the storage area (64k- to 128K-byte area) other than the BIOS storage area on the BIOS-ROM 17, the addresses designating that area are masked. Therefore, memory space allocated to that area can be opened to other than the BIOS-ROM 17. Even if the opened memory space is allocated to a memory area other than the BIOS-ROM 17 or an I/O area and then access to that area is made, there will be no possibility of accidental access to the BIOS-ROM 17.

Further, according to the present embodiment, even if errors are found in the contents of the BIOS-ROM 17 after the power is turned on, the contents of the BIOS-ROM can be refreshed with correct data from the BIOS-ROM 17 rewriting floppy disk 80. This will eliminate the need of troublesome work of opening the computer casing and then replacing the BIOS-ROM 17 with a new chip.

Note that, in the present embodiment, even if the CPU 11 is reset by some other cause than the power-on reset, the D flip-flops 71, 73 and 75 will not be reset. Even if some other reset than the power-on reset occurs, therefore, access to the storage area (64K- to 128K-byte area) other than the BIOS area in the BIOS-ROM 17 remains prohibited, said storage area being an area storing the boot block 172 and the system management routine.

A second embodiment of the invention will be described hereinafter.

In the first embodiment described above, when errors are detected in the contents of the BIOS-ROM 17 by the cyclic redundancy check procedure after the power-on reset, the BIOS file 81 stored on the BIOS-ROM rewriting floppy disk 80 is transferred to the BIOS-ROM 17 consisting of a flash memory. However, it would be convenient for the contents of the BIOS-ROM 17 to be rewritten as required, for example, in order to accommodate new version of the BIOS. The second embodiment, which is adapted to permit this type of rewriting, will be described with reference to a block diagram of FIG. 11 and a flowchart of FIG. 12. In FIG. 12, like reference characters are used to denote corresponding steps in FIG. 9.

Figure 11:
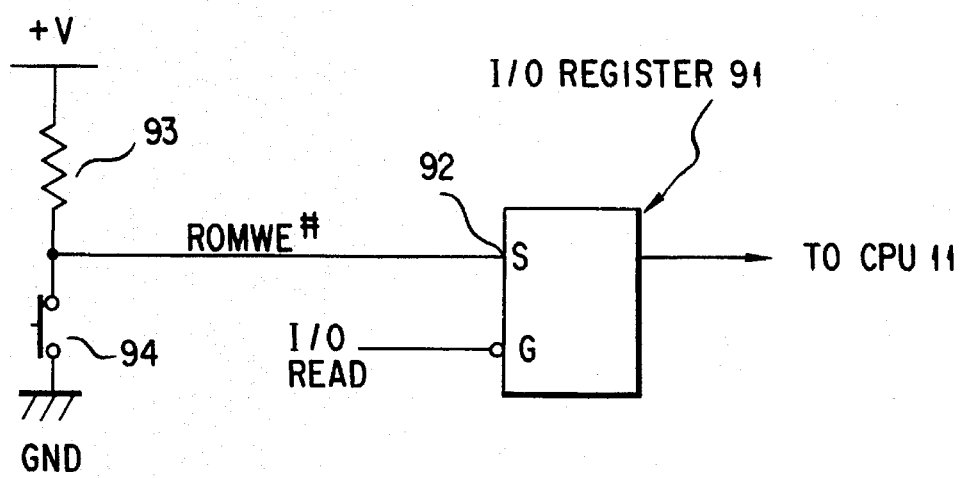
FIG. 11 illustrates a circuit in a personal computer according to a second embodiment of the present invention for instructing the transfer of the BIOS file from the floppy disk with the data map shown in FIG. 10 to the BIOS-ROM.
Figure 12:
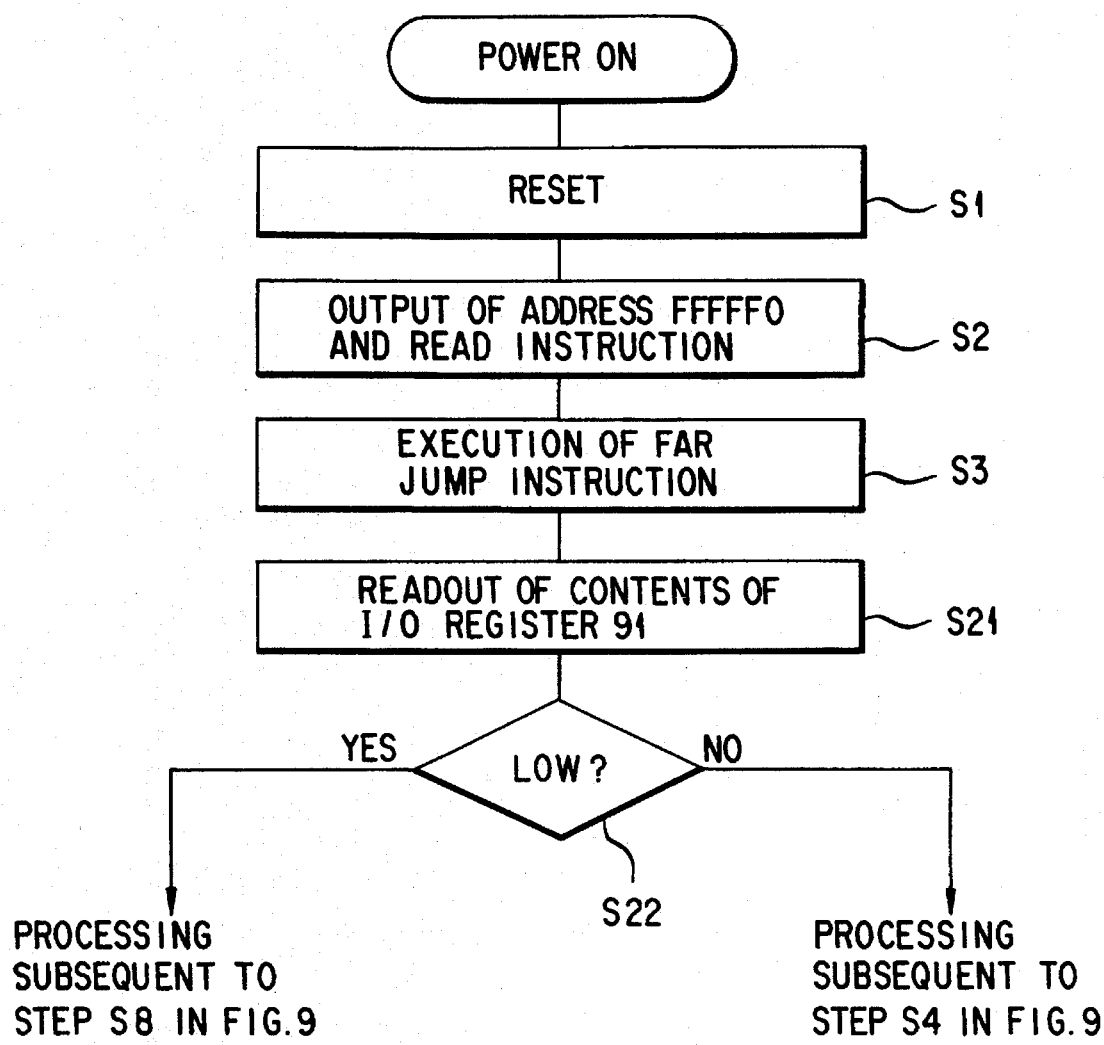

In the second embodiment, when a pin (I/O port) 92 of a 1-bit I/O register 91 shown in FIG. 11 is forced to connect to ground, the CPU 11 transfers the BIOS file 81 from the floppy disk 80 of FIG. 10 to the BIOS-ROM 17.

As shown in FIG. 11, the pin 92 of the I/O register 91 is pulled up by a resistor 93 to a supply voltage +V. A switch 94 is connected between the pin 92 and ground (GND). When the user turns on the switch, the pulled-up pin 92 is connected to ground forcibly.

If the system power has been turned on, a signal at a low level will be set into the I/O register 91 when the switch 91 is turned on. Even if the system power has not been turned on when the switch 94 is turned on, the I/O register 91 will be loaded with a signal at a low level when the system power is subsequently turned on. Also, turning on the switch 94 while the system power is being turned on permits a signal at a low level to be loaded into the I/O register 91.

In operation, when the system power is turned on, a power-on reset signal is output from the power supply controller (PSC) 39 and the CPU 11 is reset as is the case with the first embodiment (step S1). At this point, the D flip-flops 71, 73 and 75 are all reset, so that the signal DISE# goes high and the signals INV and ROMPRG go low.

When reset, the CPU 11 outputs initial address FFFFF0 and a memory read instruction required to execute the far jump instruction and then reads the far jump instruction 173 and a vector address from the boot block 172 of the BIOS-ROM 17 (step S2). The CPU 11 then executes the instruction 173 according to the vector address (step S3). The operation described so far is the same as that in the first embodiment described in connection with FIG. 9.

Unlike the first embodiment, in the destination of the jump specified by the vector address is stored a program that reads the content (state) of the I/O register 91 shown in FIG. 11 and causes a branch according to that content.

The CPU 11 reads the content of the I/O register 91 according to the program (step S21) and then determines whether it is low or not (step S22). If, in this step S22, the content of the register 91 is considered low, then a branch is made to the initialization routine 176 stored in the boot block 172 of the BIOS-ROM 17 as in the case where CRC errors are detected in the previous embodiment.

Subsequently, as is the case with the previous embodiment, steps S8 through S13 shown in FIG. 9 are carried out according to the initialization routine 176 and the transfer routine 177 on the boot block 172. Thereby, the rewriting routine 82 stored on the BIOS-ROM rewriting floppy disk 80 that has been properly loaded into the floppy disk drive 25 is transferred to the system memory 13.

Next, steps S14, S15 and S16 shown in FIG. 9 are carried out according to the rewriting routine 92 transferred to the system memory 13. This permits the BIOS file 81 stored on the disk 80 to be transferred to the main block 171 of the BIOS-ROM 17, thereby rewriting the contents of the main block. When the user turns off the system power temporarily and then turns on it again according to the prompt displayed in step S16, a series of operations identical to that performed at the power-on reset time is performed.

If, in step S22, the I/O register 91 is not in the low state, that is, if the pin 92 of the register 91 is not grounded, a jump is made to the CRC routine 174 as in the case of execution of the far jump instruction 173 in the previous embodiment, thereby performing the processing subsequent to step S4 shown in FIG. 9.

In this way, the second embodiment permits the BIOS-ROM 17 to be rewritten as required regardless of whether or not there are errors in the contents of the BIOS-ROM 17.

As described above, the switch 94 connects the pin 92 of the I/O register 91 to ground forcibly to thereby perform the ROM rewriting process at the power-on reset time. Instead, a specific key on the keyboard 35 may be used to perform the rewriting process.

The rewriting process can be performed not only at the power-on reset time but also in the normal state. In order for the system using the switch 94 to permit the rewriting process in the normal state, it is required that the CPU 11 regularly read the I/O register 91 to detect the switch having been turned on or an interruption be generated to the CPU 11 when the switch 94 is turned on.

Here, the rewriting of the BIOS-ROM 17 in the normal state will be described briefly. Upon detecting that the switch 94 or a specific key on the keyboard 35 has been operated, the CPU 11 sets the D flip-flops 71 and 73 to the low state according to the BIOS on the BIOS-ROM 17 as in the case of the power-on reset time.

Next, the CPU 11 performs processing that is substantially the same as steps S8 through S13 shown in FIG. 9. It is to be noted that, unlike steps S8 through S13 that are performed according to the program stored in the boot block 172 of the BIOS-ROM 17, that processing is performed according to the BIOS on the BIOS-ROM 17. As a result of execution of the processing, the rewriting routine 82 stored on the floppy disk 80 which is properly loaded into the disk drive 25 is transferred to the system memory 13.

Next, the same processes as steps S14, S15 and S16 shown in FIG. 9 are performed according to the rewriting routine 82 that has been transferred to the system memory 13. Thereby, the BIOS file 81 stored on the disk 80 is transferred to the main block 171 of the BIOS-ROM 17, so that the contents of the block 171 are rewritten. If, at this point, the user turns off the system power temporarily and then turns on it again, then a series of operations identical to that performed at the power-on reset time will be performed.

Although, in the first and second embodiments, the BIOS file 81 is transferred from the floppy disk drive 25 to the BIOS-ROM 17, this is not restrictive. For example, a modification may be made such that the BIOS file 81 and the rewriting routine 82 as shown in FIG. 10 are stored in a predetermined area of a hard disk loaded into the hard disk drive 21, and the BIOS file 81 is transferred from the hard disk drive 21 to the BIOS-ROM 17. In this case, it is required only that the CPU 11, after the execution of the same initialization process as step S8 shown in FIG. 9, transfer the rewriting routine 82 from the hard disk drive 25 to the system memory 13 and then perform steps S14, S15 and S16 shown in FIG. 9 to transfer the BIOS file 81 from the hard disk drive 25 to the BIOS-ROM 17. Thus, the processing corresponding to steps S9 through S12 shown in FIG. 9 becomes unnecessary. In addition, some other external storage device, such as an optical disk device, a memory card, an extension unit, etc., may be used to transfer the BIOS file to the BIOS-ROOM 17.

While the invention has been described in connection with what is presently considered to be the most practical and preferred embodiments, it is to be understood that the invention is not limited to the disclosed embodiments but, on the contrary, is intended to cover various modifications and equivalent arrangements included within the scope of the appended claims.

What is claimed is:

1. A personal computer comprising:

a BIOS-ROM comprising a flash memory having a first storage area which reserves a read-only boot area and a second storage area which stores a first basic input/output system, said first and second storage areas being distinguished from each other by a predetermined bit of address data, a far jump instruction being stored in a predetermined location of said boot area;

an external storage device for storing a second basic input/output system;

data processing means for, immediately after power-on reset, outputting predetermined address data to access said boot area of said BIOS-ROM, thereby executing said far jump instruction and for, after system startup, outputting address data differing from said predetermined address data, wherein the address data output after system startup includes address data used to access said first storage area of said BIOS-ROM, thereby performing operations according to said first basic input/output system stored in said BIOS-ROM;

address translating means, connected to said data processing means to receive the address data output from said data processing means after system startup, wherein said address data includes said predetermined bit of address data which distinguishes said first storage area and said second storage area, and for inverting a logical value of said predetermined bit and outputting the address data including the inverted bit to said BIOS-ROM;

masking means connected to said data processing means for masking address data output from said data processing means which designates said second storage area, thereby preventing said BIOS-ROM from being accessed after system startup;

instruction inputting means for inputting a transfer instruction to transfer said second basic input/output system from said external storage device to said BIOS-ROM;

first determining means for determining, by virtue of the execution of said far jump instruction, whether or not said transfer instruction is input from said inputting means;

second determining means for determining whether stored data of said BIOS-ROM is correct or not when said first determining means determines that said transfer instruction is not input from said inputting means;

means for setting said address translating means and said masking means to an enabled state when said second determining means determines that the stored data of said BIOS-ROM is correct; and means for transferring said second basic input/output system from said external storage device to said BIOS-ROM to rewrite said first basic input/output system stored in said BIOS-ROM in a first case when said first determining means determines that said transfer instruction has been input from said inputting means and in a second case when said first determining means determines that no transfer instruction is input from said inputting means and said second determining means determines that the stored data of said BIOS-ROM is incorrect, wherein said second basic input/output system is automatically transferred from said external storage device to said BIOS-ROM in said second case.

2. A personal computer comprising:

a BIOS-ROM comprising a flash memory having a first storage area which reserves a read-only boot area and a second storage area which stores a basic input/output system, said first and second storage areas being distinguished from each other by a predetermined bit of address data, a far jump instruction being stored in a predetermined location of said boot area;

data processing means for, immediately after power-on reset, outputting predetermined address data to access said boot area of said BIOS-ROM, thereby executing said far jump instruction and for, after system startup, outputting address data differing from said predetermined address data, wherein the address data output after system startup includes address data used to access said first storage area of said BIOS-ROM, thereby performing operations according to said basic input/output system stored in said BIOS-ROM; and address translating means, connected to said data processing means to receive the address data output from said data processing means after system startup, wherein said address data includes said predetermined bit of address data which distinguishes said first storage area and said second storage area, and for inverting a logical value of said predetermined bit and outputting the address data including the inverted bit to said BIOS-ROM.

3. The personal computer of claim 2, further comprising:

determining means for determining, by virtue of the execution of said far jump instruction, whether stored data of said BIOS-ROM is correct or not; and means for setting said address translating means to enabled state when it is determined by said determining means that the stored data of said BIOS-ROM is correct.

4. The personal computer of claim 2, further comprising:

masking means connected to said data processing means for masking address data output from said data processing means which designates said second storage area, thereby preventing said BIOS-ROM from being accessed after system startup.

5. The personal computer of claim 4, wherein said masking means includes means for prohibiting access to said BIOS-ROM when said predetermined bit of address output from said data processing means after system startup has a logical value indicating said second storage area of said BIOS-ROM.

6. The personal computer of claim 5, further comprising:

determining means for determining, by virtue of the execution of said far jump instruction, whether stored data of said BIOS-ROM is correct or not; and means for setting said address translating means and said masking means to an enabled state when it is determined by said determining means that the stored data of said BIOS-ROM is correct.

7. A personal computer comprising:

a BIOS-ROM comprising a flash memory having a first storage area which reserves a boot area and a second storage area which stores a basic input/output system, said first and second storage areas being distinguished from each other by a predetermined bit of address data;

data processing means for, immediately after power-on reset, outputting predetermined address data to access said boot area of said BIOS-ROM and for, after system startup, outputting address data differing from said predetermined address data, wherein the address data output after system startup includes address data used to access said first storage area of said BIOS-ROM, thereby performing operations according to said basic input/output system stored in said BIOS-ROM; and address translating means, connected to said data processing means to receive the address data output from said data processing means after system startup, for translating address data output from said data processing means which designates said first storage area to address data which designates said second area of said BIOS-ROM.

8. The personal computer of claim 7, further comprising:

masking means connected to said data processing means for masking address data output from said data processing means which designates said second storage area, thereby preventing said BIOS-ROM from being accessed after system startup.

9. The personal computer of claim 8, wherein said masking means includes means for prohibiting access to said BIOS-ROM in order to mask addresses which designate said second storage area.

10. The personal computer of claim 1, wherein said data processing means is a central processing unit.

11. The personal computer of claim 2, wherein said data processing means is a central processing unit.

12. The personal computer of claim 7, wherein said data processing means is a central processing unit.

13. The personal computer of claim 1, wherein said address translating means includes an exclusive-OR gate.

14. The personal computer of claim 2, wherein said address translating means includes an exclusive-OR gate.

15. The personal computer of claim 7, wherein said address translating means includes an exclusive-OR gate.

16. The personal computer of claim 1, wherein said masking means includes a plurality of logical gates.

17. The personal computer of claim 1, wherein said means for setting said address translating means and said masking means to an enabled state is a flip-flop which changes in state when the second determining means determines that the stored data of said BIOS-ROM is correct.

18. The personal computer of claim 2, further comprising:

a masking circuit connected to said data processing means for masking address data output from said data processing means which designates said second storage area, thereby preventing said BIOS-ROM from being accessed after system startup.

19. The personal computer of claim 18, wherein said masking circuit includes a plurality of logical gates for prohibiting access to said BIOS-ROM when said predetermined bit of address data output from said data processing means after system startup has a logical value indicating said second storage area of said BIOS-ROM.

20. The personal computer of claim 7, further comprising:

a masking circuit connected to said data processing means for masking address data output from said data processing means which designates said second storage area, thereby preventing said BIOS-ROM from being accessed after system startup.

21. The personal computer of claim 20, wherein said masking circuit includes a plurality of logical gates for prohibiting access to said BIOS-ROM in order to mask addresses which designate said second storage area.

22. A personal computer comprising:

a BIOS-ROM comprising a flash memory having a first storage area which reserves a read-only boot area and a second storage area which stores a first basic input/output system, said first and second storage areas being distinguished from each other by a predetermined bit of address data, a far jump instruction being stored in a predetermined location of said boot area;

an external storage device for storing a second basic input/output system;

a switch for inputting an instruction to transfer said second basic input/output system from said external storage device to said BIOS-ROM;

a central processing unit for, immediately after power-on reset, outputting predetermined address data to access said boot area of said BIOS-ROM, thereby executing said far jump instruction, and for, after system startup, outputting address data to access said first storage area of said BIOS-ROM, thereby performing operations according to said first basic input/output system stored in said BIOS-ROM, said central processing unit determining, by virtue of the execution of said far jump instruction, whether or not said transfer instruction is input from said switch, and further determining whether stored data of said BIOS-ROM is correct or not when said transfer instruction is determined as having not been input from said switch, said central processing unit transferring said second basic input/output system from said external storage device to said BIOS-ROM to rewrite said first basic input/output system stored in said BIOS-ROM in a first case where said central processing unit determines that said transfer instruction has been input from said switch and in a second case where, when said central processing unit determines that said transfer instruction is not input from said switch, said central processing unit determines that the stored data of said BIOS-ROM is incorrect, said second basic input/output system being automatically transferred from said external storage device to said BIOS-ROM in said second case;

an address translating circuit, connected to said central processing unit to receive at least a predetermined bit of said address data output from said central processing unit after system startup, for inverting a logical value of said predetermined bit, and for outputting the address data including the inverted bit to said BIOS-ROM;

a masking circuit connected to said central processing unit to receive said address data, for masking, after system startup, address data which is included among said address data output from said central processing unit and which designates said second storage area, thereby preventing said BIOS-ROM from being accessed; and a flip-flop for setting said address data translating circuit and said masking circuit to an enabled state when said central processing unit determines that the stored data of said BIOS-ROM is correct.

23. A personal computer comprising:

a BIOS-ROM comprising a flash memory having a first storage area which reserves a read-only boot area and a second storage area which stores a basic input/output system, said first and second storage areas being distinguished from each other by a predetermined bit of address data, a far jump instruction being stored in a predetermined location of said boot area;

a central processing unit for, immediately after power-on reset, outputting predetermined address data to access said boot area of said BIOS-ROM, thereby executing said far jump instruction, and for, after system startup, outputting address data to access said first storage area of said BIOS-ROM, thereby performing operations according to said basic input/output system stored in said BIOS-ROM; and an address translating circuit, connected to said central processing unit to receive at least a predetermined bit of said address data output from said central processing unit after system startup, for inverting a logical value of said predetermined bit and for outputting address data including the inverted bit to said BIOS-ROM.

24. A personal computer comprising:

a BIOS-ROM comprising a flash memory having a first storage area which reserves a boot area and a second storage area which stores a basic input/output system, said first and second storage areas being distinguished from each other by a predetermined bit of address data;

a central processing unit for, immediately after power-on reset, outputting predetermined address data to access said boot area of said BIOS-ROM, and for, after system startup, outputting address data to access said first storage area of said BIOS-ROM, thereby performing operations according to said basic input/output system stored in said BIOS-ROM; and an address translating circuit, connected to said central processing circuit to receive said address data output from said central processing unit after system startup, for translating address data output from said central processing unit which designates said first storage area to address data which designates said second storage area of said BIOS-ROM, and for outputting address data designating said second storage area to said BIOS-ROM.

* * * * *